United States Patent
Bleser, II et al.

(10) Patent No.: US 9,159,025 B2
(45) Date of Patent: Oct. 13, 2015

(54) PRIORITIZING REPAIR OF BRIDGES AND BRIDGE SECTIONS

(71) Applicant: HNTB Holdings, LTD., Kansas City, MO (US)

(72) Inventors: Walter F. Bleser, II, Denver, CO (US); Austin Hurst, Kansas City, MO (US); Timothy Faye Howerton, Overland Park, KS (US); Darin Welch, Smithville, MO (US)

(73) Assignee: HNTB Holdings, Ltd., Kansas City, MO (US)

( * ) Notice: Subject to any disclaimer, the term of this patent is extended or adjusted under 35 U.S.C. 154(b) by 168 days.

(21) Appl. No.: 13/739,875

(22) Filed: Jan. 11, 2013

(65) Prior Publication Data

US 2013/0124445 A1 May 16, 2013

Related U.S. Application Data

(63) Continuation-in-part of application No. 13/692,802, filed on Dec. 3, 2012, now Pat. No. 8,595,178, which is a continuation of application No. 12/570,957, filed on Sep. 30, 2009, now Pat. No. 8,326,791.

(60) Provisional application No. 61/160,962, filed on Mar. 17, 2009.

(51) Int. Cl.
*G06N 5/00* (2006.01)
*G06N 5/02* (2006.01)
*G06Q 10/04* (2012.01)
*G06Q 10/06* (2012.01)
*G06Q 50/08* (2012.01)

(52) U.S. Cl.
CPC ............... *G06N 5/02* (2013.01); *G06Q 10/04* (2013.01); *G06Q 10/06* (2013.01); *G06Q 50/08* (2013.01)

(58) Field of Classification Search
None
See application file for complete search history.

(56) References Cited

U.S. PATENT DOCUMENTS

| | | | |
|---|---|---|---|
| 6,240,783 B1 * | 6/2001 | McGugin et al. | 73/594 |
| 2006/0240807 A1 * | 10/2006 | Masquelier | 455/412.2 |
| 2008/0061959 A1 * | 3/2008 | Breed | 340/539.1 |
| 2009/0024336 A1 * | 1/2009 | Tatom et al. | 702/56 |

OTHER PUBLICATIONS

Notice of Allowance in U.S. Appl. No. 13/692,802, mailed Jul. 24, 2013, 37 pages.
Ashikari, et al., Automated Prediction of Condition State Rating in Bridge Inspection, Gerontechnology, 2012, pp. 1-6.

* cited by examiner

*Primary Examiner* — Alan Chen
(74) *Attorney, Agent, or Firm* — Shook, Hardy & Bacon, L.L.P.

(57) ABSTRACT

Embodiments of the invention are generally directed toward methods, systems, and computer-readable media for prioritizing bridge repairs. A bridge score is generated that represents various factors such as conditions, load issues, risk of failure, and importance. Repairs to bridges or bridge segments that pose a greater risk may be prioritized before repairs made to bridges posing a lower risk.

25 Claims, 12 Drawing Sheets

FIG. 7.

| CONDITION SCORE | | | |
|---|---|---|---|
| DECK PORTION OF CONDITION SCORE | | 15.00% | "STATIC" INPUT SPECIFIED BY USER OR BY DEFAULT SETTINGS |
| SUPERSTRUCTURE PORTION OF CONDITION SCORE | | 50.00% | |
| SUBSTRUCTURE PORTION OF CONDITION SCORE | | 25.00% | |
| CHANNEL / WATERWAY PORTION OF CONDITION SCORE | | 10.00% | |
| LOGIC CHECK | | 100.00% | OKAY |
| | | | |
| CONDITION RATING - DECK | $CR_a$ | 6 | "DYNAMIC" INPUT OBTAINED FROM SEGMENT-SPECIFIC INSPECTION INFORMATION |
| CONDITION RATING - SUPERSTRUCTURE | $CR_b$ | 6 | |
| CONDITION RATING - SUBSTRUCTURE | $CR_c$ | 7 | |
| CONDITION RATING - CHANNEL / WATERWAY | $CR_d$ | 7 | |
| | | | |
| PORTION OF CONDITION SCORE - DECK | $W_{max,a}$ | 0.15 | IF $CR_a$ IS CODED "N", $W_{max,a} = 0$ |
| PORTION OF CONDITION SCORE - SUPERSTRUCTURE | $W_{max,b}$ | 0.50 | IF $CR_b$ IS CODED "N", $W_{max,b} = 0$ |
| PORTION OF CONDITION SCORE - SUBSTRUCTURE | $W_{max,c}$ | 0.25 | IF $CR_c$ IS CODED "N", $W_{max,c} = 0$ |
| PORTION OF CONDITION SCORE - CHANNEL / WATERWAY | $W_{max,d}$ | 0.10 | IF $CR_d$ IS CODED "N", $W_{max,d} = 0$ |
| SUM OF APPLICABLE MAX CONDITION WEIGHT FACTORS | $\Sigma(W_{max})$ | 1.00 | |
| | | | |
| ADJUSTED MAX WEIGHT FACTOR - DECK | $W_{adj,a}$ | 0.15 | $W_{adj,a} = W_{max,a} / \Sigma W_{max}$ |
| ADJUSTED MAX WEIGHT FACTOR - SUPERSTRUCTURE | $W_{adj,b}$ | 0.50 | $W_{adj,b} = W_{max,b} / \Sigma W_{max}$ |
| ADJUSTED MAX WEIGHT FACTOR - SUBSTRUCTURE | $W_{adj,c}$ | 0.25 | $W_{adj,c} = W_{max,c} / \Sigma W_{max}$ |
| ADJUSTED MAX WEIGHT FACTOR - CHANNEL / WATERWAY | $W_{adj,d}$ | 0.10 | $W_{adj,d} = W_{max,d} / \Sigma W_{max}$ |
| | | | |
| WEIGHTED CONDITION RATING - DECK | $WCR_a$ | 0.90 | $WCR_a = W_{adj,a} \times CR_a$ |
| WEIGHTED CONDITION RATING - SUPERSTRUCTURE | $WCR_b$ | 3.00 | $WCR_b = W_{adj,b} \times CR_b$ |
| WEIGHTED CONDITION RATING - SUBSTRUCTURE | $WCR_c$ | 1.75 | $WCR_c = W_{adj,c} \times CR_c$ |
| WEIGHTED CONDITION RATING - CHANNEL / WATERWAY | $WCR_d$ | 0.70 | $WCR_d = W_{adj,d} \times CR_d$ |
| SUM OF WEIGHTED CONDITION RATINGS | $\Sigma(WCR)$ | 6.35 | |
| | | | |
| FACTORED CONDITION RATING - DECK | $FCR_a$ | 6.35 | ALL EQUATIONS SIMILAR TO THOSE SHOWN FOR $FCR_b$ — $FCR_b = 2 \cdot WCR_b$, IF $6 \leq CR_b \leq 9$; $FCR_b = 0.2(CR_b - 3) \cdot 2(WCR_b) - 6(CR_b)$, IF $2 \leq CR_b \leq 5$; $FCR_b = 1$, IF $CR_b = 1$; $FCR_b = 0$, IF $CR_b = 0$ |
| FACTORED CONDITION RATING - SUPERSTRUCTURE | $FCR_b$ | 6.35 | |
| FACTORED CONDITION RATING - SUBSTRUCTURE | $FCR_c$ | 6.35 | |
| FACTORED CONDITION RATING - CHANNEL / WATERWAY | $FCR_d$ | 6.35 | |
| | | | |
| CONTROLLING FACTORED CONDITION RATING (CFCR) | CFCR | 6.35 | CFCR = MINIMUM FCR |
| CONDITION SCORE | CS | 70.56% | $CS = CFCR/9$ |

LOAD RATING SCORE

| | | | | | | | |
|---|---|---|---|---|---|---|---|
| SCORE CURVE RADIUS | R | 1.3811 | OKAY | | | | |
| ORIGIN | O | 0.5000 | | | | | |
| PERCENTAGE ABOVE MAX STRESSES ALLOWED | | | | 10% | OKAY ["STATIC" INPUT] | | |
| MINIMUM $RF_{max}$ ALLOWED | | | | $P_{max}$ | 0.9292 | $RF_{min,m} = 1/(1 + P_{max})$ | |

| EQUIPMENT | APPROXIMATE % OF ANNUAL TRAFFIC | NORMAL RATING FACTOR | MAXIMUM RATING FACTOR | RATING FACTOR RANGE | RATING FACTOR RANGE BELOW NORMAL RATING FACTOR OF 1.0 | FRACTION OF RANGE BELOW NORMAL RATING FACTOR OF 1.0 | EQUIPMENT SCORE | EQUIPMENT SCORE ADJUSTED FOR TRAFFIC |
|---|---|---|---|---|---|---|---|---|
| | $p$ | $RF_{normal}$ | $RF_{max}$ | $RF_{range} = 1.0 - RF_{normal} + RF_{max} - RF_{normal}$ | $RF_{bn} = 1 - RF_{normal}$ | $F_{bn} = RF_{bn} / RF_{range}$ | $ES_{eq} = (R^2 - (F_{bn} - O)^2)^{0.5} + O$ | $ES_{eq} \cdot p = ES_{eq,a}$ |
| E60 | 0% | 0.6875 | 1.0500 | 0.3534 | 0.3125 | 0.6692 | 54.20% | 0.00% |
| GENESIS + R47 | 60% | 1.1000 | 1.1000 | NA | NA | NA | 100.00% | 60.00% |
| AAR 286 | 20% | 0.9900 | 1.0100 | 0.2109 | 0.0100 | 0.0092 | 96.69% | 19.34% |
| AAR 263 | 20% | 0.9375 | 1.0125 | 0.2650 | 0.0625 | 0.3767 | 81.52% | 16.31% |
| | | | | NA | NA | NA | 0.00% | 0.00% |
| | | | | NA | NA | NA | 0.00% | 0.00% |
| | | | | NA | NA | NA | 0.00% | 0.00% |
| | | | | NA | NA | NA | 0.00% | 0.00% |
| | | | | NA | NA | NA | 0.00% | 0.00% |
| | | | | NA | NA | NA | 0.00% | 0.00% |
| LOGIC CHECK | 100% | OKAY | | | | | $LS = \Sigma(ES_{eq,a})$ | |
| LOAD RATING SCORE | | | | | | | | 95.65% |

"DYNAMIC," SEGMENT-SPECIFIC INPUT

FIG. 8.

RISK SCORE

| | |
|---|---|
| FRACTURE / FATIGUE PORTION OF RISK SCORE | 20% |
| VEHICULAR COLLISION PORTION OF RISK SCORE | 40% |
| FLAGGING PORTION OF RISK SCORE | 25% |
| SCOUR / EROSION PORTION OF RISK SCORE | 15% |

| RISK CATEGORY | RISK QUESTION | YES/NO | SCORE | DEDUCTION VALUE |
|---|---|---|---|---|
| FRACTURE / FATIGUE | IS THE SEGMENT OR SUPPORTING SUBSTRUCTURE FRACTURE CRITICAL? (SEE BELOW) | NO | 0.0 | 10.0 |
| | • ARE FRACTURE CRITICAL MEMBERS INTERNALLY REDUNDANT? | NO | NA | 2.5 |
| | • DO FRACTURE CRITICAL MEMBERS HAVE FATIGUE PRONE DETAILS? | YES | NA | 2.5 |
| | • DOES BRIDGE CARRY FREIGHT? | YES | NA | 2.5 |
| | • IS FATIGUE RATING LESS THAN NORMAL RATING? | YES | NA | 2.5 |
| VEHICULAR COLLISION | DOES THE BRIDGE HAVE LOW VEHICULAR TRAFFIC CLEARANCE AND IS IT SUSCEPTIBLE TO BEING HIT? | NO | 0.0 | 20.0 |
| | • HAS BRIDGE EXPERIENCED A VEHICULAR COLLISION? | YES | NA | 8.0 |
| | • HAS BRIDGE EXPERIENCED MULTIPLE VEHICULAR COLLISIONS? | YES | NA | 12.0 |
| FLAGGING | DOES BRIDGE CURRENTLY HAVE A RED FLAG ITEM? | YES | 17.0 | 17.0 |
| | DOES BRIDGE CURRENTLY HAVE A YELLOW FLAG ITEM? | YES | 8.0 | 8.0 |
| SCOUR / EROSION | DOES BRIDGE CURRENTLY HAVE OR HAVE A HISTORY OF SCOUR OR EROSION PROBLEMS? | YES | 15.0 | 15.0 |
| SUM OF DEDUCTIONS | | | 40.0 | 100.0 |
| RISK SCORE | RS = {100 − Σ (RD)} | | 60.00% | |
| LOGIC CHECK | OKAY | | | |

A SEGMENT IS FRACTURE CRITICAL IF BOTH OF THE FOLLOWING ARE TRUE:
• IT IS NOT STRUCTURALLY REDUNDANT
• THE PRIMARY LIVE LOAD CARRYING MEMBERS ARE STEEL AND SUBJECT TO TENSILE STRESSES

"DYNAMIC," SEGMENT-SPECIFIC INPUT

"STATIC" INPUT

*FIG. 9.*

PRIORITIZING REPAIR OF BRIDGES AND BRIDGE SECTIONS

CROSS-REFERENCE TO RELATED APPLICATION

This application is a continuation-in-part application of U.S. application Ser. No. 13/692,802 (filed on Dec. 3, 2012), which is a continuation application of U.S. application Ser. No. 12/570,957 (filed on Sep. 30, 2009), which claims the benefit of U.S. Provisional Application No. 61/160,962 (filed on Mar. 17, 2009). All of the aforementioned applications are incorporated by reference herein.

SUMMARY

Embodiments of the invention are defined by the claims below, not this summary. A high-level overview of various aspects of the invention are provided here to introduce a selection of concepts that are further described below in the detailed-description section. This summary is not intended to identify key features or essential features of the claimed subject matter, nor is it intended to be used as an aid in isolation to determine the scope of the claimed subject matter. In brief, and at a high level, the subject matter described in this specification includes prioritizing the repair of bridges and bridge segments or spans based on various factors, such as bridge-element conditions, load considerations, risk evaluations, and importance.

BRIEF DESCRIPTION OF THE DRAWINGS

Illustrative embodiments of the present invention are described in detail below with reference to the attached drawing figures, which are incorporated herein by reference in their entirety, wherein:

FIGS. 7-11 depict tables of data representing exemplary score determinations in accordance with embodiments of the present invention.

DETAILED DESCRIPTION OF AN EMBODIMENT OF THE PRESENT INVENTION

Figure 1A:
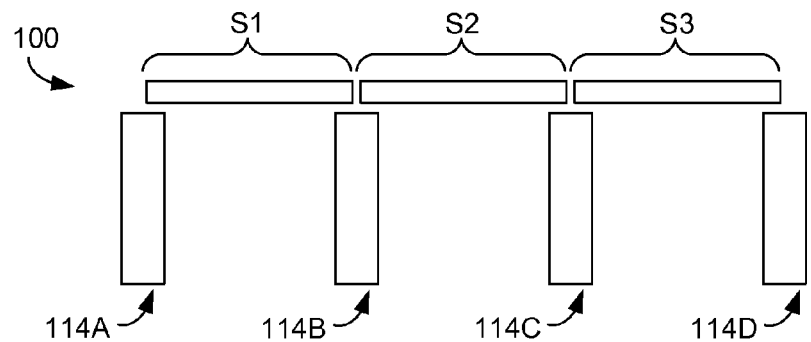
FIGS. 1A and 1B illustrate a simple-span bridge in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly stated.

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

An embodiment of the present invention is directed to calculating a score of a bridge. A bridge might include various types of structures, such as a simple-span bridge or a continuous-span bridge. The score might suggest, infer, or quantify various concepts, such as risk of not repairing, repair prioritization, and the like. Scores of multiple bridges or bridge segments might be compared to prioritize repair of bridges or bridge segments. Various information and factors might be taken into consideration when generating a score of a bridge, such as bridge-element conditions, load considerations, risk or likelihood-of-failure considerations, and importance. Furthermore, these factors might be evaluated and combined in various ways to generate a score.

In some embodiments, factors might be evaluated and combined as described in U.S. application Ser. No. 13/692, 802 and U.S. application Ser. No. 12/570,957, which are incorporated herein by reference in their entirety. For example, U.S. application Ser. No. 13/692,802 and U.S. application Ser. No. 12/570,957 describe various factors that might be used when determining a score or risk factor of a bridge. In U.S. application Ser. No. 13/692,802 and U.S. application Ser. No. 12/570,957, FIG. 4 describes a load factor; FIG. 5 describes a condition factor, FIG. 6 describes a consequence-of-failure factor that is related to bridge importance; and FIG. 8 describes combining the load factor, condition factor, and consequence-of-failure factor. FIGS. 4-6 and 8 are merely exemplary methods of how each of these factors might be determined and combined, and in one embodiment, these methods are used to assess a continuous-span bridge for a roadway. However, each of these factors might be assessed, calculated, and mathematically combined in various other manners to suggest or infer different conclusions. The strategy used to generate and combine factors might vary based on different considerations, such as the type of bridge being assessed, risk preferences of a bridge owner, and the like.

Figure 1B:
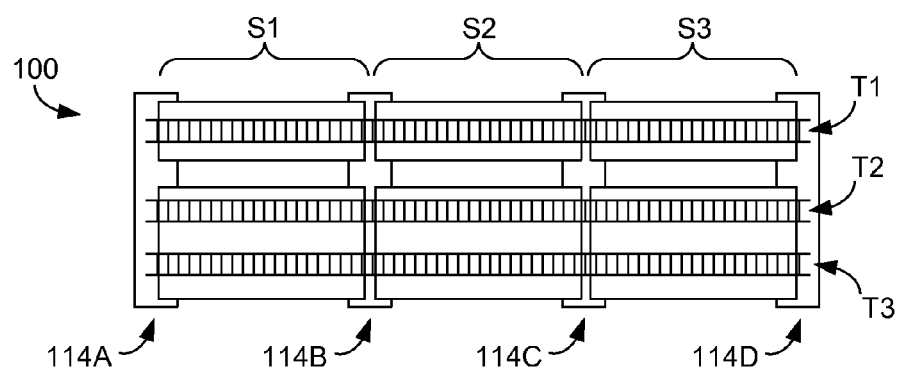

Another embodiment of the present invention is directed to determining a score of a simple-span bridge that prioritizes repair of the bridge or of a segment in the bridge. For instance, the score might be compared to one or more other bridges or segments to determine which bridge or segment is evaluated to include a higher repair priority. Illustrative depictions of a simple-span bridge 100 are provided in FIGS. 1A and 1B. FIG. 1A presents a side view and FIG. 1B presents a top plan view.

Simple-span bridge 100 includes a plurality of spans S1, S2, and S3. In addition, FIG. 1B depicts that simple-span bridge 100 includes three tracks T1, T2, and T3. As such, simple-span bridge 100 includes a plurality of span-and-track segments, including S1-T1, S1-T2-T3, S2-T1, S2-T2-T3, S3-T1, and S3-T2-T3. A segment is defined in bridge 100, such that each segment can support a live load between substructure elements 114A-D and independent of other segments included in bridge 100.

When determining a score of a simple-span bridge, various factors, criteria, considerations, and the like might be evaluated. Exemplary variables that might be used to determine a score include bridge-element conditions, load considerations, risk evaluations, and rated importance. These variables might be quantified and combined in various manners to calculate a score of a bridge. For example, quantified variables might be weighted, added together, subtracted, multiplied, divided, and/or modified by other mathematical operations. In addition, variables might be assessed at various levels of a bridge. For instance, in one embodiment, a separate score is generated for each segment of a bridge (e.g., S1-T1, S1-T2-T3, S2-T1, S2-T2-T3, S3-T1, and S3-T2-T3). The set of segment scores might be used to determine an overall score of the bridge, which might be compared to scores of other bridges. IN addition each segment score might be compared to other segment scores. The set of segment scores might be analyzed using numerous strategies, such as by determining an average, median, and/or lowest controlling segment score. These variables and methods of determining bridge and segment scores are described in more detail in other portions of this description.

Figure 2:
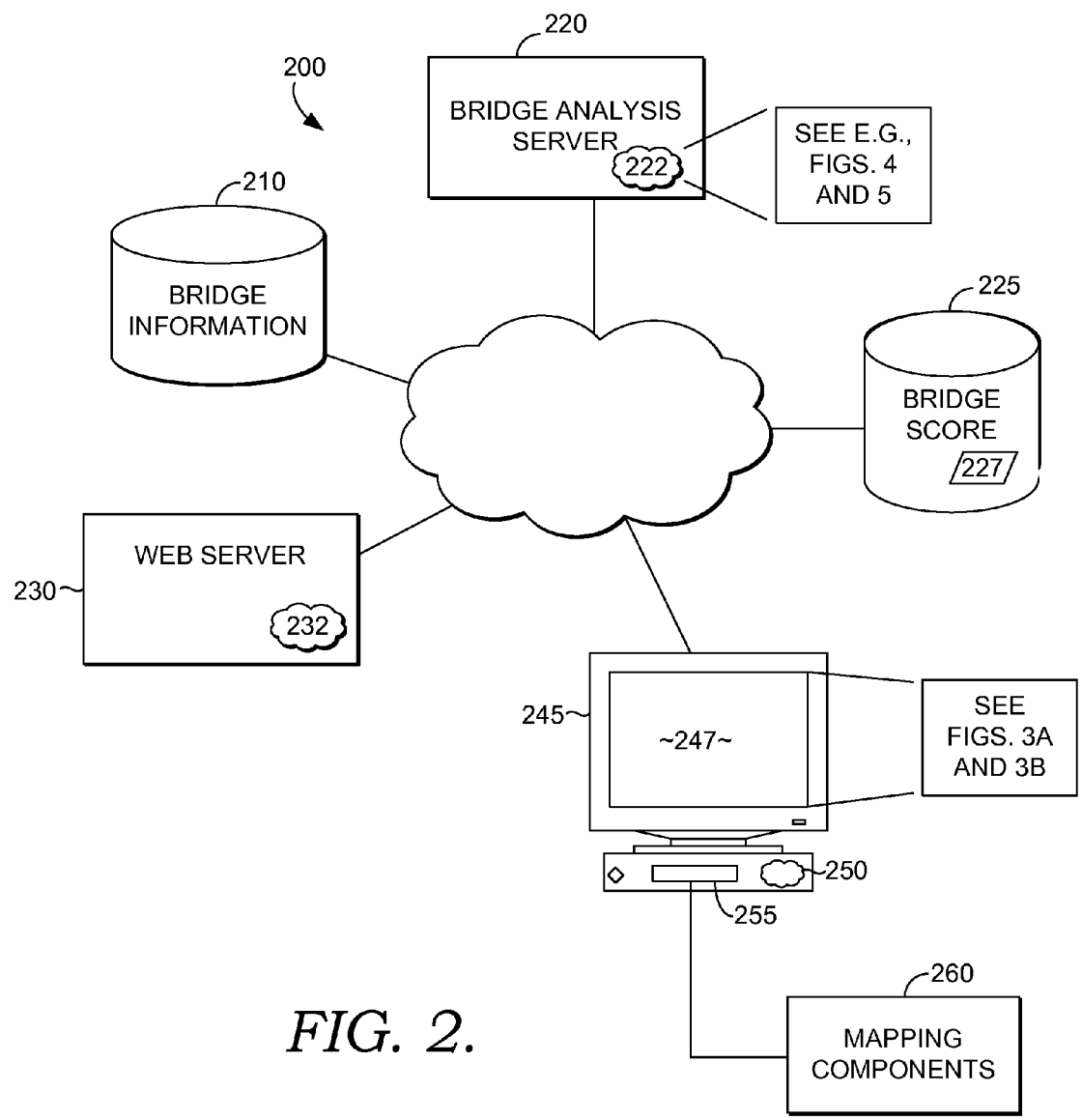
FIG. 2 depicts an exemplary computing system architecture in accordance with an embodiment of the present invention.

Turning now to FIG. 2, a block diagram is illustrated that shows an exemplary computing system architecture 200 suitable for performing a bridge-score analysis, which is usable to analyze variables associated with a bridge and/or bridge segments to determine a bridge score. The exemplary computing system architecture 200 might include some elements having a similar functionality to those depicted in FIG. 1 of U.S. application Ser. No. 13/692,802 and U.S. application Ser. No. 12/570,957. It will be understood and appreciated by those of ordinary skill in the art that the computing system architecture 200 shown in FIG. 2 is merely an example of one suitable computing system and is not intended to suggest any limitation as to the scope of the use or functionality of embodiments of the invention. Neither should the computing system architecture 200 be interpreted as having any dependency or requirement related to any single component/module or combination of components/modules illustrated therein.

Computing system architecture 200 includes bridge-information data store 210, bridge-analysis server 220, scoring application 222, bridge-score data store 225, web server 230, bridge-data-retrieval application 232, client device 245, display application 250, map API 255, and mapping component 260. Computing system architecture 200, and one or more of the components depicted therein, may reside on a single computing device or a distributed computing environment that includes multiple computing devices (e.g., servers, clients) coupled with one another via one or more networks. Such networks may include, without limitation, one or more local area networks (LANs) and/or one or more wide area networks (WANs). Such network environments are commonplace in offices, enterprise-wide computer networks, intranets, and the Internet. Accordingly, the network, or combination of networks, is not further described herein.

The bridge-information data store 210 includes a computer-readable media suitable for storing information, such as information describing the physical characteristics of a plurality of bridges. Among other things, bridge characteristics described in the bridge-information data store 210 include a unique bridge identifier useable to correlate bridge information among sources.

Bridge-information data store 210 might include other information, such as information describing the condition of various structural elements of a plurality of bridges. Examples of structural elements include super-structure elements, substructure elements, deck elements, and channel/waterway elements, among others. Condition information might be represented as a numerical value that correlates to a defined scale, which provides for the quantification of a condition-state of a bridge element. For example, a condition of a bridge element might be rated based on a scale of 0-9. Condition information might be received from various sources. In one embodiment, condition information is transmitted to web server 230 by a client device, such as in the context of a bridge inspection. Condition information might also be retrieved from stored inspections.

Other bridge characteristics that might be stored within the bridge-information data store 210 include load considerations. Examples of load considerations include load capacities, such as design loads, legal loads, and posted loads. Other load considerations include load demands, such as measured loads, extrapolated loads, and actual loads. In addition, load considerations might include traffic type, such as passenger, freight, or maintenance, and a percentage of annual traffic that includes each traffic type (e.g., 30% of traffic is passenger). In one embodiment load information maintained in bridge-information data store includes respective percentage of various load cases (e.g., E80, AAR 286, AAR315, and Genesis+ M7). Information related to load considerations might be obtained from various sources. For example, information might be solicited in the form of questions or requests for input presented to a user in the context of a score calculation.

In a further embodiment, bridge-information data store 210 maintains other information used to assess risk associated with a bridge. Information used to assess risk associated with a bridge includes the presence of red and/or yellow flags, as well as the presence and extent of structurally redundant elements and fracture critical elements. The presence and extent of scour and fatigue-susceptible elements might also be stored in bridge-information data store. Other risk-relevant information stored in bridge-information data store 210 might include the occurrence of one or more vehicle collisions associated with a bridge. In addition, the extent to which a bridge carries freight might also be used to assess risk associated with a bridge. Information related to risk considerations might be obtained from various sources. For example, information might be solicited in the form of questions or requests for input presented to a user in the context of a score calculation.

Data store 210 might store additional information used to assess an importance of a bridge. Examples of importance related information includes route importance, such as whether the route is relevant to national security or emergency services. In addition, traffic counts and type of traffic may be stored in data store 210, as well as a number of tracks per segment and the ability to shift to alternative services or lines to provide services. Information related to importance considerations might be obtained from various sources. For example, information might be solicited in the form of questions or requests for input presented to a user in the context of a score calculation. Many other bridge characteristics may also be stored within the bridge-characteristic data store 210.

Information stored in bridge-information data store 210 might be organized in different manners. For example, information might be categorized by information type, bridge, and bridge segment. Moreover, the information stored in bridge-index data store 210 is maintained in a manner that is sortable and searchable. Further, information in bridge-index data store 210 might be collected and aggregated from various sources. In one embodiment, information is transmitted to web server 230 by way of client devices. For example, such transmission might occur in the context of a bridge inspection. In addition, information might be solicited in the form of questions or requests for input presented to a user in the context of a score calculation. Further, information that is stored in bridge-information data store 210 is retrievable by other components depicted in FIG. 2 to enable determination of bridge and segment scores.

The bridge-analysis server 220 is a computing device that contains software 222 capable of executing various computer applications. The bridge-analysis server 220 might be networked with other computing devices including the other computing devices shown in computing environment 200. The bridge-analysis server 220 might communicate with the bridge-information data store 210, the bridge-score data store 225, and other components that may or may not be shown in FIG. 2.

The scoring application 222 calculates a prioritization score for bridges and segments included in the bridge-information data store 210. For example, the scoring application 222 might calculate a score of an entire bridge. In addition the score application 222 might calculate scores of one or more segments included in a bridge. The scoring application 222 might receive or retrieve information used to calculate a score from various sources. For example, the scoring application might obtain information stored in the bridge-information data store 210. In addition, information might be obtained or solicited from a client device by leveraging server 230. In addition to overall segment and bridge scores, the scoring application 222 may also calculate constituent factors that are used to calculate bridge and segment scores, such as a conditions score, a load-rating score, a risk score, and an importance score. The scoring application 222 might save both the overall bridge and segment scores and constituent factors in bridge-score data store 225. The calculation of the scores is explained in more detail in other portions of this Description.

The bridge-score data store 225 includes a computer-readable media. The bridge-score data store 225 is a data store that stores the results of the prioritization score calculations performed for a plurality of bridges and bridge segments by the scoring application 222. The scores of the plurality of bridges and segments may be stored in a suitable data structure 227, such as a relational database. In addition to the overall scores of a bridge and of individual segments, intermediate factors (e.g., condition, load, risk, importance, etc.) used to calculate the overall scores may also be stored in the bridge-score data store 225. The scores included in data store 225 are searchable and retrievable by other components included in architecture 200, such as by web server 230.

The web server 230 is a computing device capable of interfacing with other computing devices over a network. The web server 230 is capable of hosting web pages and communicating their constituent portions to requesting web browsers over a network, such as the Internet. The bridge-data-retrieval application 232 is executed by the web server 230. The bridge-data-retrieval application 232 communicates with the display application 250 on client device 245 to display bridge information on a graphical user interface (GUI) 247. Thus the bridge-data-retrieval application 232 interfaces with the score and constituent-factor data within the bridge-score data store 225 and converts it into a format suitable for display in GUI 247.

In one embodiment, the graphical user interface 247 includes a map on which a bridge is located using spatial coordinates stored in association with the bridge, such as in the bridge-score index 225. In another embodiment, the GUI includes a depiction of simple-span bridge that interactively displays bridge and segment scores, as well as other information useful to prioritize a bridge. An example of the presentation output of such a GUI 247 is shown in more detail with reference to FIGS. 3A and 3B, which are described in more detail in other parts of this Description. The mapping component 260 is a combination of hardware and software that provides map data. The mapping component 260 may be provided by a third party that makes the mapping data available. The map data is accessed through the map API 255. ERSI, Google, Microsoft, and Yahoo provide mapping components that may be suitable for use in embodiments of the present invention.

Additional aspects of scoring application 222 will now be described in subsequent paragraphs. As indicated, when determining a score of a simple-span bridge, various factors might be taken into consideration, such as condition scores, load-rating scores, risk score, and importance scores. In an embodiment of the present invention, a score of a simple-span bridge is generated based on a score of one or more segments included in the bridge. For example, analysis of bridge 100 might be broken down into span-and-track combinations including S1-T1, S1-T2-T3, S2-T1, S2-T2-T3, S3-T1, and S3-T2-T3. As such, scores are generated for the segments and are used to determine an overall score for the bridge.

A score of a segment might be generated using various factors, and in one embodiment, a condition score of the segment, a load-rating score of the segment, a risk score of the segment, an importance score of the segment, or a combination thereof are used to determine a segment score. The condition score, load score, risk score, and importance score might be combined in various ways to generate a segment score. For example, these scores might added, multiplied, subtracted, divided, averaged, and modified by other mathematical operations. In addition, each of these scores might be weighted according to preference of a user (e.g., bridge owner) or to a suggested weighting scheme. That is, respective weights might be assigned to each of the factors based on which factors are deemed more relevant to prioritizing repairs. In another embodiment, a threshold is established and if a particular segment score fails to satisfy the threshold, then the particular score is equated with the bridge score.

In accordance with an embodiment of the present invention, the score of a span-and-track segment is determined by scoring application 222 using Equation 2, defined as:

$$\text{Segment Score} = W_1 C + W_2 L + W_3 R + W_4 I \quad (2)$$

In Equation 2, each of $W_1$, $W_2$, $W_3$, and $W_4$ represents a respective weight factor, and collectively the weight factors add to one (1). In addition, C represents a condition score of the segment; L represents a load-capacity score of the segment; R represents a risk score of a segment; and I represents an importance score of the segment. As such, $W_1$ is a weight factor applied to the condition score of the segment C; $W_2$ is a weight factor applied to the load-rating score of the segment L; $W_3$ is a weight factor applied to the risk score of the segment R; and $W_4$ is weight factor applied to the importance score of the segment I. Each weight factor is customizable to reflect preferences of a particular user. For example, a first user might prefer to place a greater amount of weight on the condition score as compared to a second user. In addition, default weight factors might be utilized when no other weight-factor values are specified or customized. Some or all of the scores C, L, R, and I, might be retrieved from bridge-information data store 210 or from bridge-score data store 225.

In one embodiment the segment score of Equation 2 is a percentage with a maximum value of 100%. In addition, various inferences might be drawn from a segment score. For example, in one embodiment, a first segment including a lower segment score than a second segment indicates that repair of the first segment should be prioritized higher than repair of the second segment. In a further embodiment various types of input are provided in order to execute Equation 2. For example, one type of input is static input specified by a user (e.g., bridge owner). The term "static" does not necessarily mean that the input doesn't ever change. Rather, "static" indicates that the input often remains constant when calculating scores of different bridges or bridge segments and/or that the input remains constant when scores are calculated for a same bridge over time (e.g., from year to year). An example of static input includes some weight factors (e.g., $W_1$, $W_2$, $W_3$, and $W_4$). In addition to static input, dynamic input is also used to execute Equation 2. "Dynamic" input refers to input that changes from bridge to bridge and within the same bridge over time. Examples of dynamic input include bridge-inspection results. Calculation of each of the variables C, L, R, and I is described below.

In an embodiment of the present invention, scores of a plurality of segments included in a simple-span bridge are determined. For example, Equation 2 might be applied to each of segments S1-T1, S1-T2-T3, S2-T1, S2-T2-T3, S3-T1, and S3-T2-T3 included in simple-span bridge 100 to determine a segment score of each segment. Moreover, each score of the plurality of segments might be used to determine the score of the simple-span bridge. For example, a score that indicates a highest repair priority among the generated segment scores might be selected and assigned as an overall bridge score. That is, in an embodiment of the present invention, a single segment score is selected from among a plurality of segment scores and is assigned as the score of the simple-span bridge. Segment scores might be evaluated in other manners to determine an overall score of a simple-span bridge, such as by average, median, or failure to meet a threshold.

Information used to define each of the variables included in Equation 2 might be maintained in various data stores, such as bridge information data store 210. In addition, bridge-analysis server 220 might be leveraged by application 222 to perform various operations defined in Equation 2. For example, bridge-analysis server 220 might be used to retrieve quantified factors from data store 210 and to transmit to bridge score data store 225, results generated by application 222. In other embodiments, information might be obtained by web server 230 from a client device.

In Equation 2, the condition score C of a segment might be based on condition scores of multiple bridge elements included in the segment, such as a superstructure of the segment, a substructure of the segment, a deck-structure of the segment, and a channel or waterway structure of the segment. Moreover, the condition score of each bridge element includes a quantified rating of a condition of the element that is weighted to reflect an importance of the element relative to the other bridge elements. For example, a condition score of a superstructure of a segment would include a quantified rating of the condition of the superstructure modified by a weighting factor, which reflects an importance of the superstructure relative to the substructure, deck-structure, and channel/waterway structure. Likewise, each of the substructure, deck-structure, and channel/waterway structure would receive respective weighting factors. The condition scores of each of the segment structural elements are combined to generate the overall condition score C of the segment.

In another embodiment, the condition score C of a segment is determined using Equation 3, which includes:

$$\text{Condition Score } C = CFCR/9 \qquad (3)$$

In Equation 3, the term CFCR represents a Controlling Factored Condition Rating. In one embodiment, the CFCR is the minimum value included among a Deck Factored Condition Rating ($FCR_D$), a Superstructure Factored Condition Rating ($FCR_S$), a Substructure Factored Condition Rating ($FCR_B$), and a Channel/waterway Factored Condition Rating ($FCR_C$). Moreover, as described directly below, the CFCR is a function of weighting factors applied to the condition rating of four condition rated elements; deck, superstructure, substructure and channel/waterway. A Factored Condition Rating, or FCR, is calculated for each applicable condition rated item, and the lowest being the controlling rating.

In one embodiment, the calculation of a FCR for each structural element depends on a comparison of a Condition Rating (CR) of a structural element to a range of values. For example, the calculation of FCR might depend on where a CR falls within a range of 0-9. In a further embodiment, the following logic is applied to each structural element determine a respective FCR:
  if CR=0, then FCR=0;
  if CR=1, then FCR=1;
  if $2 \leq CR \leq 5$, then $FCR = -0.2(CR^2 + \Sigma(WCR) \times (1-CR) - 6CR)$; and
  if $6 \leq CR \leq 9$, then $FCR = \Sigma(WCR)$.

The term $\Sigma(WCR)$ represents a Sum of Weighted Condition Ratings, and is used to calculate FCR when the CR falls in a specified range of values. In one embodiment, the Sum of Weighted Condition Ratings is determined using Equation 4:

$$\Sigma(WCR) = WCR_D + WCR_S + WCR_B + WCR \qquad (4)$$

In Equation 4, $WCR_D$ represents a Weighted Condition Rating for deck; $WCR_S$ represents a Weighted Condition Rating for superstructure; $WCR_B$ represents a Weighted Condition Rating for substructure; and $WCR_C$ represents a Weighted Condition Rating for channel/waterway. Moreover, each Weighted Condition Rating W for a respective element is determined as follows:

$W_{MF-D} = W_{AMF-D} / \Sigma(W_{AMF})$
$W_{MF-S} = W_{AMF-S} / \Sigma(W_{AMF})$
$W_{MF-B} = W_{AMF-B} / \Sigma(W_{AMF})$
$W_{MF-C} = W_{AMF-C} / \Sigma(W_{AMF})$ In these equations, $W_{AMF-D}$ represents an Applicable Maximum Condition Weight Factor for deck, as defined by the user (e.g., bridge owner); $W_{AMF-S}$ represents an Applicable Maximum Condition Weight Factor for superstructure; $W_{AMF-B}$ represents an Applicable Maximum Condition Weight Factor for substructure; and $W_{AMF-C}$ represents an Applicable Maximum Condition Weight Factor for channel/waterway. In one embodiment, if the Condition Rating is not available, then the Applicable Maximum Condition Weight Factor is zero (e.g., if $CR_C$="N", $W_{AMF-C}$=0). Furthermore, the Sum of Applicable Maximum Condition Weight Factors $\Sigma(W_{AMF})$ is equal to the sum of $W_{AMF-D}$, $W_{AMF-S}$, $W_{AMF-B}$, and $W_{AMF-C}$. As with other static input (e.g., Applicable Maximum Condition Weight Factor) default values might be used if no user-specified values are provided.

The Deck Factored Condition Rating, $FCR_D$, is directed to condition ratings of deck elements of a segment. Applying the above logic to calculation of the $FCR_D$, calculation of the $FCR_D$ depends on where the Deck Condition Rating ($CR_D$) falls within a range of 0-9. That is:
  if $CR_D$=0, then $FCR_D$=0;
  if $CR_D$=1, then $FCR_D$=1;

if $2 \leq CR_D \leq 5$, then $FCR_D = -0.2(CR_D^2 + \Sigma(WCR) \times (1 - CR_D) - 6CR_D)$; and if $6 \leq CR_D \leq 9$, then $FCR_D = \Sigma(WCR)$.

The term $\Sigma$ (WCR) represents a Sum of Weighted Condition Ratings, and is described above. In an embodiment, each of the Superstructure Factored Condition Rating ($FCR_S$), Substructure Factored Condition Rating ($FCR_B$), and a Channel/waterway Factored Condition Rating ($FCR_C$) are determined using a similar logic scheme as it applies to respective Condition Ratings (CR). Once each Factored Condition Rating is calculated, Equation 3 can be solved based on the minimum value. An exemplary calculation of a condition score R applying Equation 3, Equation 4, and the logic described with respect thereto, is illustrated by a spreadsheet depicted in FIG. 7.

Returning to Equation 2, the load-rating score L of the segment might be determined based on different variables. For example, the load-rating score might be based at least in part on a ratio of load capacity to load demand. In addition, a type of traffic that traverses a segment (e.g., passenger, freight, and maintenance) is quantified and might be included in the load-rating score. That is, passenger traffic, freight traffic, and maintenance traffic might each be quantified to include a respective rating, which is included in the load-rating score of the segment. In one embodiment, a load-rating score of a segment is determined using Equation 5, which includes:

$$\text{Load-rating Score } (L) = \Sigma(LS_{EA}) \quad (5)$$

In Equation 5, $LS_{EA}$ represents "individual equipment load rating scores that are adjusted for traffic" and is calculated using Equation 6, which includes:

$$LS_{EA} = P \times LS_E \quad (6)$$

In Equation 6, P represents an "approximate percentage of annual traffic for the equipment used to generate an equipment score" and $LS_E$ represents an equipment score. In one embodiment the load-rating score L can be composed of multiple traffic adjusted equipment scores, and the total percentage of annual traffic for all considered equipment equals 100%.

In Equation 6, the equipment score represents the individual load rating score for a single equipment configuration. In one embodiment, normal and maximum load rating factors are computed for individual load cases, such as E80, Genesis+M7, AAR 286, and AAR 315. The load cases may at least represent the actual equipment that typically operates on the bridge. In a further embodiment, an equipment score $L_{SE}$ is determined using Equation 7, which includes:

$$LS_E = \sqrt{R^2 - \left(\frac{1-RF_N}{1-RF_N + RF_M - \left(\frac{1}{1+A_{MAX}}\right)} - \frac{1-\sqrt{2 \times R^2 - 1}}{2}\right)^2} + \frac{1-\sqrt{2 \times R^2 - 1}}{2} \quad \text{(Equation 7)}$$

In Equation 7, $RF_N$ represents a Normal Rating Factor and $RF_M$ represents a Maximum Rating Factor. In addition, R represents a Score Curve Radius, and $A_{MAX}$ represents a Maximum percentage above maximum rating stresses allowed. As such, the load rating score has two user provided variables that are determined prior to calculation: the score curve radius (R) and the percentage above maximum rating stresses that is allowed ($A_{MAX}$). The radius factor controls the rate at which the load rating score decreases as the maximum rating factor approaches 1.0 or the minimum maximum rating factor allowed. As the radius increases, the rate of score decrease approaches a line. A small radius causes a more sudden drop in the load rating score as the maximum rating factor approaches 1.0 or the minimum maximum rating factor allowed. In one embodiment, a default score curve radius might be about 1.58113883008419.

In Equation 7, threshold requirements might be set for the radius. For example, in one embodiment, the radius might be required to be greater than or equal to 1.0. The origin of the load rating score curve is calculate as a function of the radius. The factor that represents the percentage above maximum rating stresses that is allowed controls the point at which the score curve intersects with the axis that represents a load rating score of zero. The user is allowed to adjust this value. An exemplary determination of a load-rating score L is provided by a spreadsheet depicted in FIG. 8.

Returning to Equation 2, the risk score R of the segment is determined based on various factors. For example, flagging of the segment is quantified and may be weighted depending on the type of flag. As such, flagging may be factored into the risk score based on a number of flags and a type of flags. In addition, the amount of scour associated with a segment might be quantified based on presence and severity, such that scour may also be factored into the risk score. Moreover, the presence of structurally redundant elements and fracture critical elements might be rated and included in the risk score. Vehicle collisions associated with a segment may also be factored into the risk score based on a number and severity of collisions. Vehicle collisions might also be incorporated into the risk score as a flag.

In one embodiment, the risk score R is determined using Equation 8, which includes:

$$\text{Risk Score } (R) = (100 - \Sigma(RD))/100 \quad (8)$$

In Equation 8, "RD" represents a value of deduction applied to each risk-score variable, such as fracture and fatigue, vehicular collision, flagging, and scour and erosion. For example, a user might supply input in response to a series of "YES" or "NO" questions regarding these variables. Each question is given a value that, depending on the answer to the risk question, will be deducted from 100. Deduction values are considered a type of static user-provided information. In addition, default deduction values might be utilized. In one embodiment, deduction values are based on a relative importance of each variable. For example, if vehicular collisions were deemed more important to the overall risk score than scour and erosion, the deduction value(s) associated with the vehicular collisions questions might be higher than the deduction values associated with the scour and erosion questions.

Evaluation of fracture and fatigue issues might be broken down into a series of YES/NO questions. For example, a user might indicate whether a segment or supporting substructure is facture critical. If "yes" then a specified deduction is subtracted from a starting value (e.g., 100) and if "no" then no deduction is applied. Moreover, in one embodiment, if the segment or supporting substructure is not facture critical then other questions related to fracture and fatigue issues are not applied. However, if the segment or supporting substructure is fracture critical, then other user indications are obtained as to whether the fracture critical members internally redundant (YES yields no deduction and NO yields a deduction); whether fracture critical members have fatigue prone details (NO yields no deduction and YES yields a deduction); whether the bridge carries freight (NO yields no deduction and YES yields a deduction); and whether the fatigue rating is less than a normal rating (NO yields no deduction and YES yields a deduction).

In a further embodiment, evaluation of vehicular collision issues is broken down into a series of YES/NO questions. For example, a user might indicate whether a bridge includes any low vehicular traffic clearance susceptible to being hit. If "yes" then a specified deduction is subtracted and if "no" then no deduction is applied. Moreover, in one embodiment, if there is no low vehicular traffic clearance susceptible to being hit then other questions related to vehicular collision issues are not applied. However, if low vehicular traffic clearance susceptible to being hit to exist, then other user indications are obtained as to whether the bridge has experienced a vehicular collision (NO yields no deduction and YES yields a deduction); and whether the bridge has experience multiple vehicular collisions (NO yields no deduction and YES yields a deduction).

In another embodiment, evaluation of flagging issues is broken down into a series of YES/NO questions. For example, a user might indicate whether a bridge has any red flags or any yellow flags. If "yes" then one specified deduction might subtracted for any red flags and a different deduction might be subtracted for any yellow flags. No deduction is applied if there are no red or yellow flags.

Evaluation of scour and erosion is also broken down into a YES/NO input. If a bridge does have (or has a history of) scour or erosion problems, then a deduction is subtracted.

As indicated in Equation 8, once all of the deductions have been identified, a sum of the deduction is used to calculate the Risk Score (R). An exemplary determination of a risk score R is provided by a spreadsheet depicted in FIG. 9.

Referring again to Equation 2, the importance score I of the segment is quantified based on various factors. Possible factors used to determine the importance score include traffic counts, type of traffic, re-route distance and time, and a number of tracks on a segment. In one embodiment, The importance score is a percentage with a maximum value of 100%, and higher scores indicate lower importance to the transportation system. In a further embodiment, the importance score is calculated using Equation 9, which includes:

$$\text{Importance Score } (I) = (1/12) \times (\Sigma(\text{IMPORTANCE LEVEL VALUES}) - 3) \quad (9)$$

Figure 10:
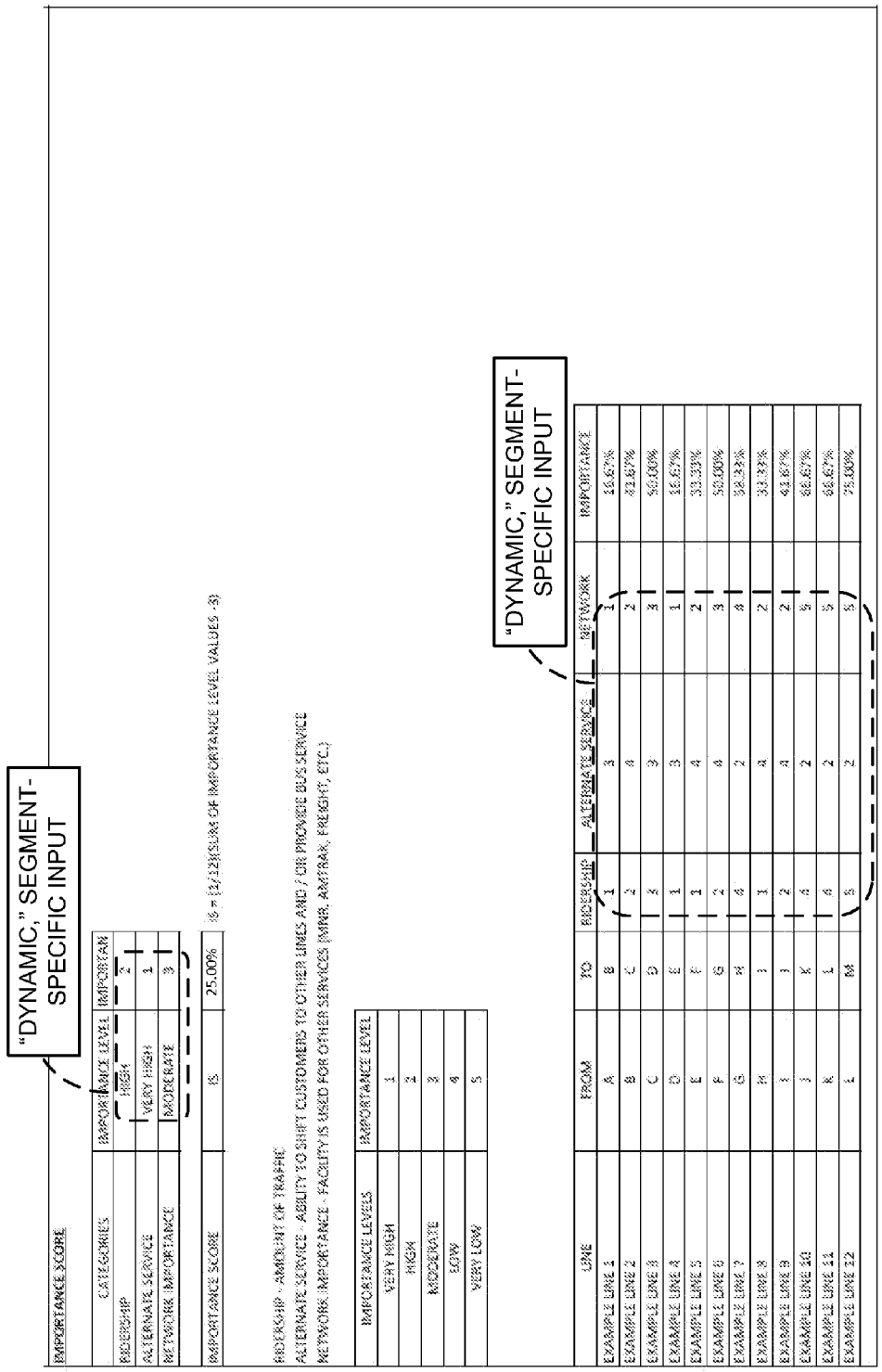

In Equation 9, a sum of various importance values is determined. The importance values quantify subjective assessment of ridership (i.e., relative amount of traffic that uses the bridge); alternative service (i.e., ability to shift customers to other lines and/or provide alternative transportation service); and network importance (i.e., whether the line bridge is used for other services, such as commuter, freight, equipment, and the like). For example, for each category of ridership, alternative service, and network importance, a user might provide a value between 1 and 5. Using such a scale, 1 represents "Very High," 2 represents "High," 3 represents "Moderate," 4 represents "Low," and 5 represents "Very Low." An exemplary determination of an importance scores I is provided by a spreadsheet depicted in FIG. 10.

Figure 11:
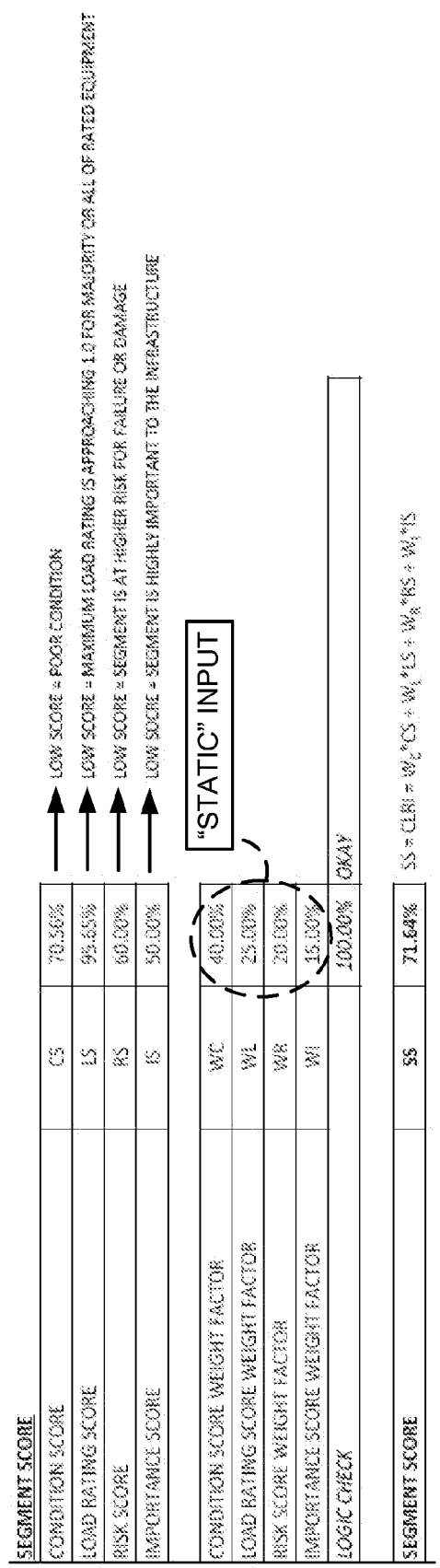

Once each of the variables C, L, R, and I have been determined, Equation 2 may be executed to calculate a segment score. An exemplary determination of a segment score is provided by the spreadsheet depicted in FIG. 11. The values for each of the variables C, L, R, and I depicted in FIG. 11 are also depicted in FIGS. 7-10, and the importance score is based on "Example Line 3" in FIG. 10. As indicated in other portions of this description, a respective segment score might be calculated for each segment of a bridge, and the plurality of segment scores might be used in various ways to determine an overall score of a bridge.

Figure 3A:
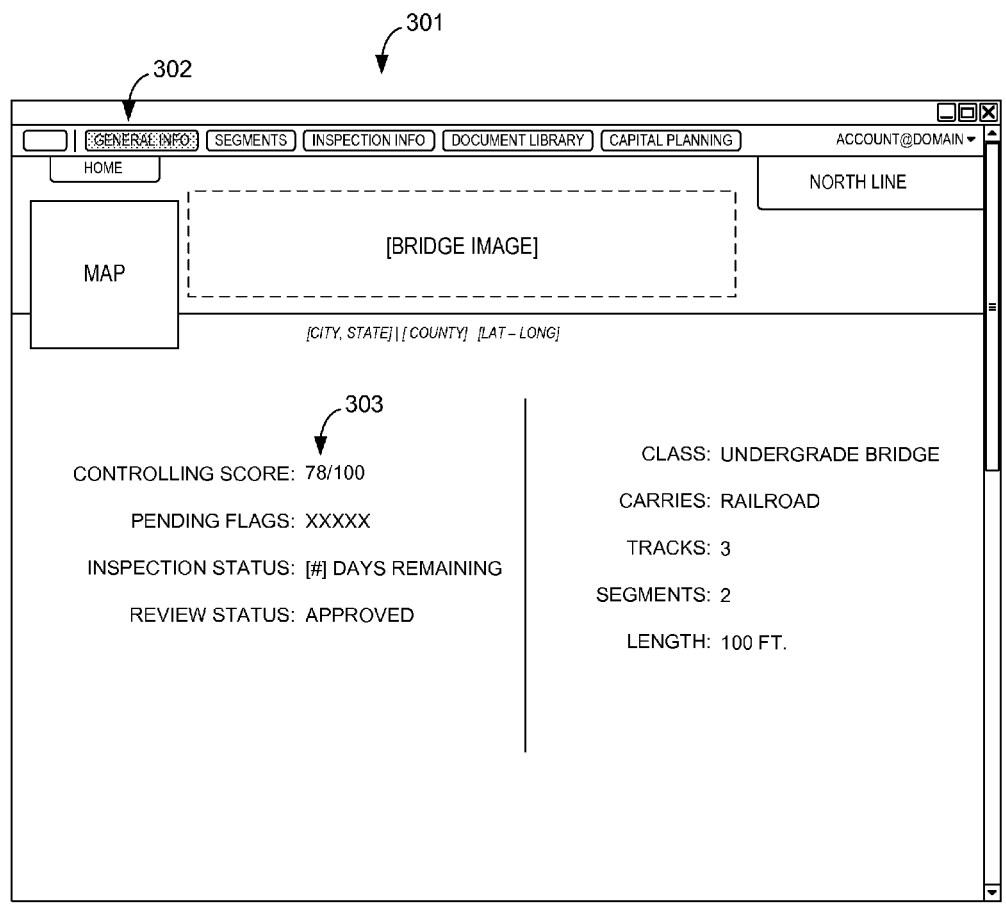
FIGS. 3A and 3B illustrate screenshot presentations according to embodiments of the present invention.

Referring now to FIG. 3A, the graphical user interface (GUI) 247 will be described in more detail. FIG. 3A illustrates an exemplary a screenshot 301 resulting from operations of the GUI 247. Screenshot 301 might be produced by various types of applications, such as a web browser that receives information from web server 230. In screenshot 301, a general-information tab 302 is shaded to illustrate that information depicted by the GUI in screenshot 301 is generally related to a subject bridge. For example, information presented in screenshot 301 includes a controlling score 303 of an overall bridge structure, as well as several other categories of general information (e.g., class, length, flats, inspection information, and the like). Information presented in screenshot 301 might be obtained from various sources, such as data stores 210 and 225.

Controlling score 303 might represent one or more of various metrics generated by scoring application 222. For example, controlling score 303 might be a lowest segment score of segments of the subject bridge. Controlling score 303 might also be an average or median segment score. In one embodiment, the algorithm used to determine controlling score 303 is customizable to dynamically change the controlling score. For example, the algorithm might be changed from using a lowest controlling segment score to applying an average segment score calculation. In another example, controlling score 303 might be calculated using a first algorithm including a first set of weights factors (e.g., condition is weighted higher than risk). In that case, a user can request recalculation of controlling score 303 using a second algorithm that applies a second set of weights (e.g., risk is weighted higher than condition). Other algorithms might be specified that are based on a specific factor. For example, a user might request that an algorithm be applied that only evaluates segments based condition scores.

Screenshot 301 depicts general information related to a subject bridge, and other bridge information (e.g., segment-level information) is requestable using the various tabs provided. For example, selecting a tab provided in screenshot 301 might prompt a request to receive information. The request might be sent to retrieval application 232 to a native application running on a client device. Exemplary tabs depicted in FIG. 3A include a "segments" tab, "inspection information" tab, "document library" tab, and "capital planning" tab. In this respect, screenshot 301 depicts a point (e.g., web page) from which additional bridge-related information might be requested.

Figure 3B:
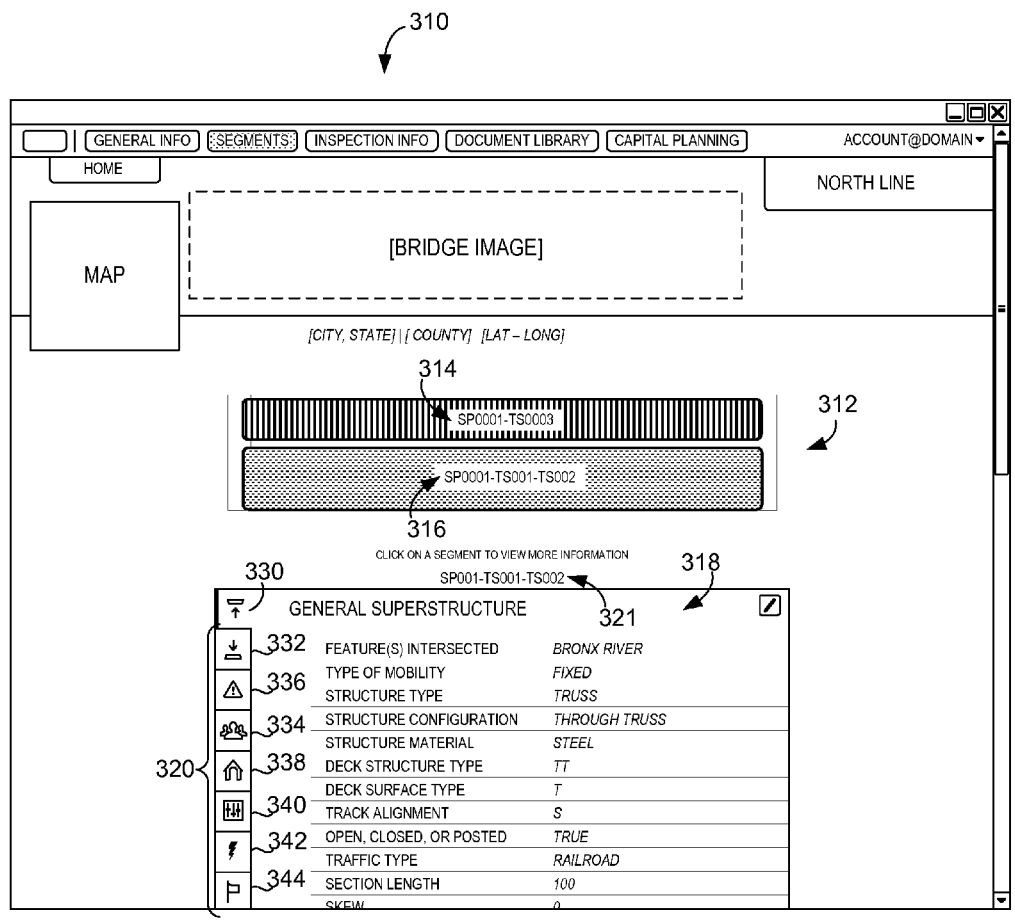

Referring now to FIG. 3B, the graphical user interface (GUI) 247 will be further described. FIG. 3B illustrates an exemplary a screenshot 310 resulting from operations of the GUI 247. For example, a segments tab 308 is shaded to illustrate that the segments tab has been selected to request segment-relevant information. Screenshot 310 includes a bridge illustration 312 that graphically depicts a top plan view of a subject bridge, which includes two different segments 314 and 316. In addition, screenshot 310 includes a textual-information section 318, which provides various information describing the subject bridge and bridge segments. For example, heading 321 indicates that information provided in section 318 is associated with segment 316 (SP001-TS002-TS002).

In order to render the variety of information provided in screenshot 310, GUI 247 might receive information from web server 230 and bridge-data-retrieval application 232 or from a native application (not shown) running on client 245. For example, as indicated in other portions of this description bridge-data-retrieval application 232 retrieves score and constituent-factor data within the bridge-score data store 225 and converts it into a format suitable for display by GUI 247. In one embodiment, display application 250 facilitates exchange of information between GUI 247 and application 232. For example, display application 250 may facilitate an exchange of a request for bridge and bridge segment data, as well as the provision of the requested data.

In one embodiment, information presented in information section 318 is updated or modified based on an input. For example, various icons 320 are provided that are selectable to view different types of information relevant to the subject bridge or bridge segment. Icons 320 might be represent various categories of information relevant to a particular segment. Examples of categories of information include superstructure 330, substructure 332, ownership 334, maintenance 336, condition information 338, load information 340, collision information 342, and structure flags 344. These are merely exemplary categories and various other categories might be created based on information that is tracked and maintained with respect to a bridge and bridge segment, such as information include in data stores 210 and 225. For example, inspection records might also be provided, as well as importance information.

In another embodiment, inputting a particular segment depicted by the bridge illustration 312 might also cause different information to be presented in the textual-information section 318. That is, by selecting segment 314, information relevant to segment 314 may be populated into the information section 318. Inputting one of the icons 320 or a segment might include various inputs, such as a cursor click, touch input, hover input, and the like. In a further embodiment, other textual information is presented by way of an overlay presentation box (not depicted) that appears in front of the information illustrated in FIG. 3B. For example, hovering over a particular segment may invoke display of an overlay presentation box, which includes information pertaining to the particular segment.

In one embodiment, information related to a bridge and segments of the bridge is stored locally on a client computing device. As such, providing input to GUI might invoke retrieval of the locally stored information. In another embodiment, information related to a bridge and segments of the bridge is maintained on a networked component (e.g., bridge-score data store), such that providing an input to GUI prompts a request to bridge-data-retrieval application 232.

Each of the segments 314 and 316 includes a respective pattern or color usable to illustratively depict relative prioritization scores. For example, segment 314 might be color-coded green and segment 316 might be color-coded red, such that the red color coding of segment 316 indicates that segment 316 includes a higher repair priority than segment 314. Color-coding or designs may be used to convey other information as well. For example, if an overall bridge score is determined based on a controlling segment score, then color coding or designs might be used to visually communicate which segment is associated with the controlling score.

Information depicted by GUI 247 might be dynamically updated in response to input. For example, segments 314 and 316 include respective patterns or color coding, which reflects relative prioritization scores generated by scoring application 222. The relative prioritization scores represented by each color-coding or design scheme might depict various scores based on user input. For example, in one embodiment, segments 314 and 316 might be color-coded based on overall segment scores. In another embodiment, a particular constituent score (e.g., condition, load, risk, and importance) might be specified by a user, such that the color-coding or design scheme is dynamically updated to reflect the specified constituent. For example, it might be desirable to obtain a visual comparison of segments based solely on condition scores, as opposed to a combination of scores. In such an example, the GUI will request updated information that is usable to modify the illustrated bridge to color-code segments based on the conditions scores when the condition-score constituent is specified. As described above, scoring application 222 applies weights to element-condition ratings, segment condition scores, segment load-factor scores, segment risk scores, and segment importance scores. In another embodiment of the present invention, these weights may be changed in GUI 247 to dynamically update scores.

Figure 4:
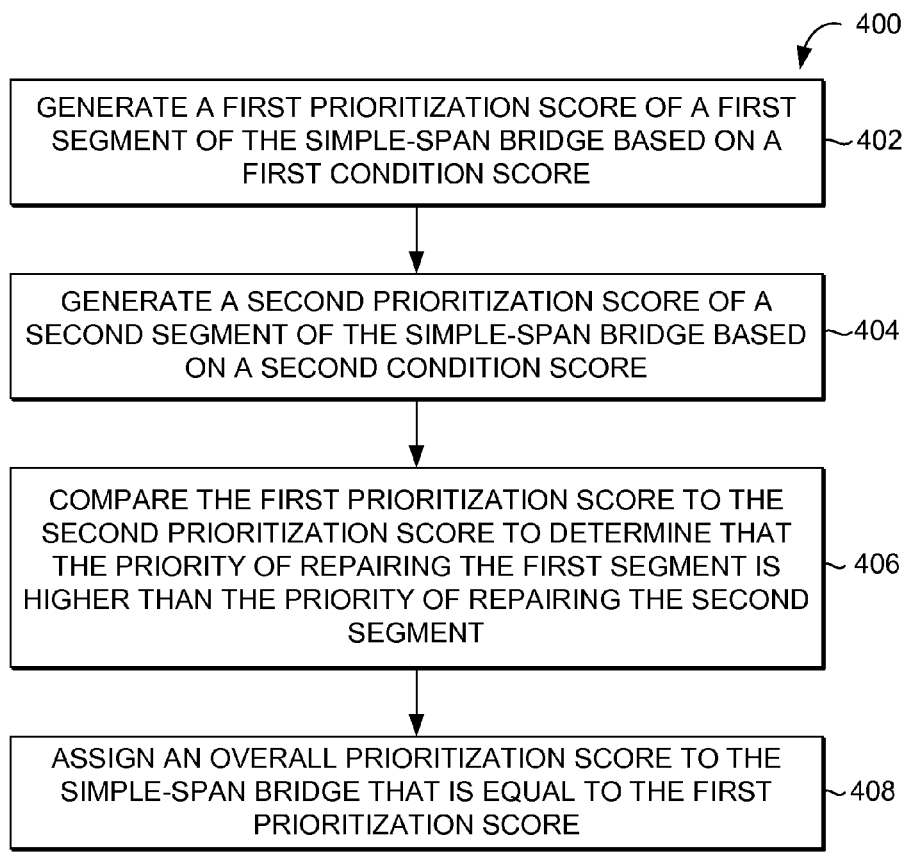
FIGS. 4-6 illustrate flow diagrams depicting respective methods in accordance with embodiments of the present invention.
Figure 5:
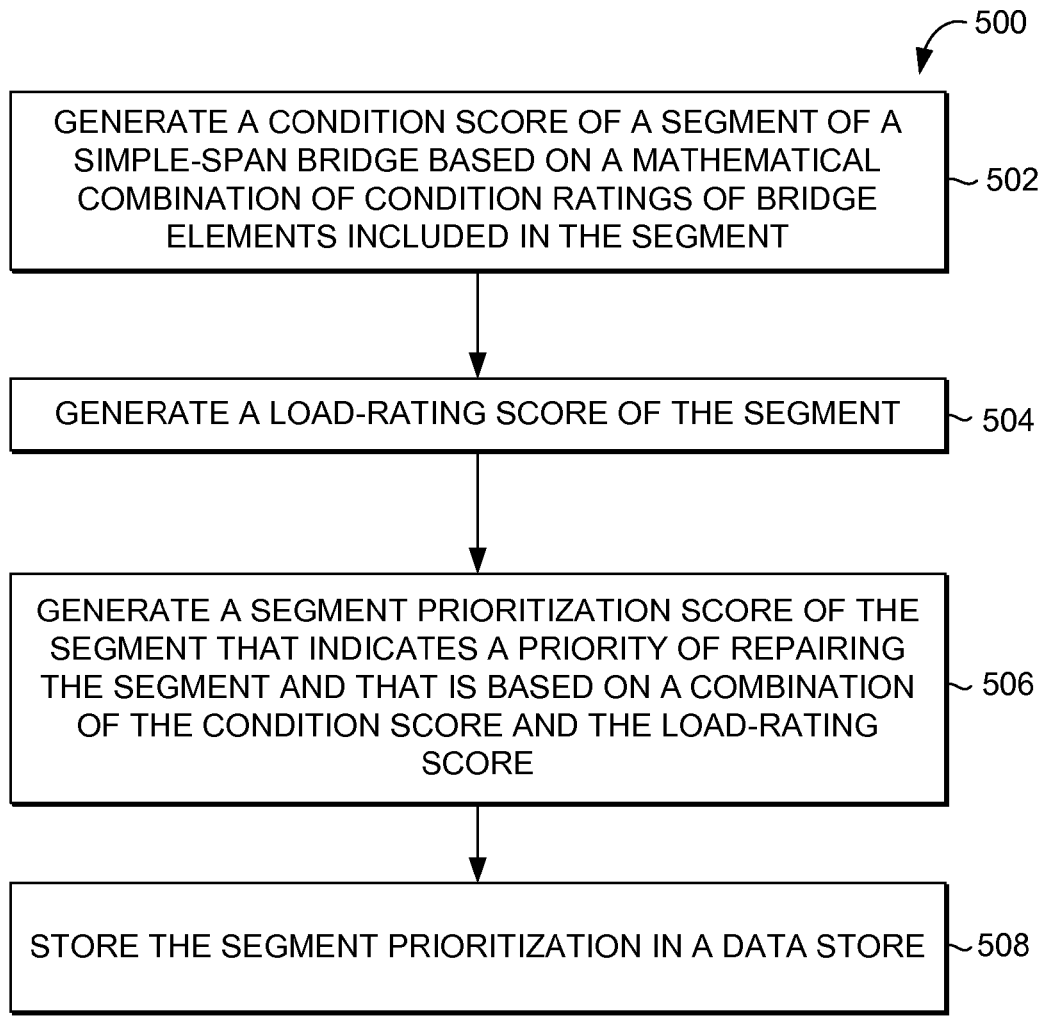

Referring now to FIG. 4, a flow diagram 400 is depicted that illustrates steps taken in accordance with an embodiment of the present invention. For example, steps in FIG. 4 might be executed as part of a computer-implemented method. In addition, computer-readable media might store computer-executable instructions that, when executed, cause a computing device to perform the steps included in flow diagram 400. The steps depicted in flow diagram 400 include a method of prioritizing repair of a simple-span bridge. When describing flow diagram 400, reference is also made to FIGS. 1A-1B.

Step 402 includes generating a first prioritization score of a first segment of the simple-span bridge that indicates a priority of repairing the first segment. The first prioritization score is based on a first condition score of the first segment that is calculated using a first set of condition ratings assigned to structural elements included in the first segment. For example, Equation 2 might be applied to information associated with segment S1-T1 to generate a segment score, which is characterized as a prioritization score of segment S1-T1. As indicated above, Equation 2 is based on a condition score C of the segment that is calculated using a set of condition ratings assigned to structural elements included in the segment.

Step 404 includes generating a second prioritization score of a second segment of the simple-span bridge that indicates a priority of repairing the second segment. In addition, the second prioritization score is based on a second condition score of the second segment that is calculated using a second set of condition ratings assigned to structural elements included in the second segment. For example, Equation 2 might be applied to information associated with segment S1-T2-T3.

In step 406, the first prioritization score is compared against the second prioritization score to determine that the priority of repairing the first segment is higher than the priority of repairing the second segment. As a result of the comparing, in step 408, an overall prioritization score is assigned to the simple-span bridge that is equal to the first prioritization score of the first segment.

Referring now to FIG. 5, a flow diagram 500 is depicted that illustrates steps taken in accordance with an embodiment of the present invention. For example, steps in FIG. 5 might be executed as part of a computer-implemented method. In addition, computer-readable media might store computer-executable instructions that, when executed, cause a computing device to perform the steps included in flow diagram 500. The steps depicted in flow diagram 500 include a method of prioritizing repair of a simple-span bridge. When describing flow diagram 500, reference is also made to FIGS. 1A-1B.

Step 502 includes generating a condition score of a segment of the simple-span bridge based on a mathematical combination of condition ratings of bridge elements included in the segment. For example, a condition score C of the segment S1-T1 might be calculated using a set of condition ratings assigned to structural elements included in the segment S1-T1.

At step 504 a load-rating score of the segment is generated based on an equipment score (e.g., $LS_E$) of a load case that is adjusted by a percentage of traffic associated with the load case.

Step 506 includes generating a segment prioritization score of the segment that indicates a priority of repairing the segment and that is based on a combination of the condition score and the load-rating score. For example, Equation 2 might be performed to generate a segment score of S1-T1. At step 508, the segment prioritization score is stored in a data store.

Figure 6:
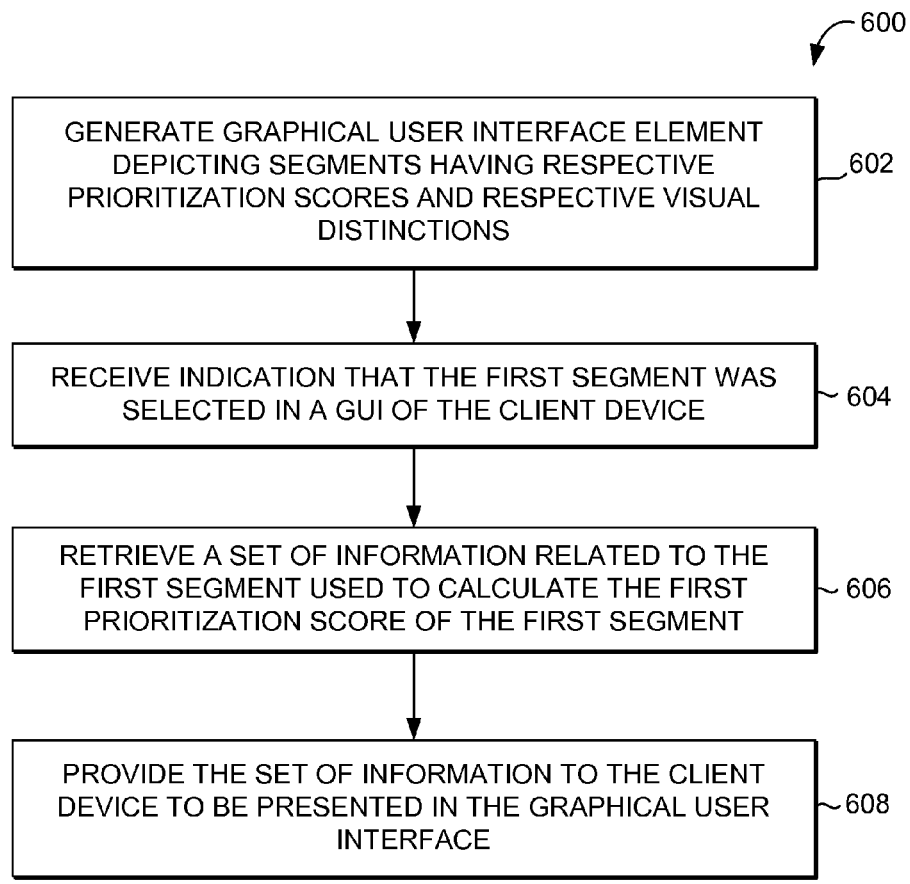

Referring now to FIG. 6, a flow diagram 600 is depicted that illustrates steps taken in accordance with an embodiment of the present invention. For example, steps in FIG. 6 might be executed as part of a computer-implemented method. In addition, computer-readable media might store computer-executable instructions that, when executed, cause a computing device to perform the steps included in flow diagram 600. The steps depicted in flow diagram 600 include a method of prioritizing repair of a simple-span bridge. When describing flow diagram 600, reference is also made to FIGS. 1A-1B and FIG. 3B.

Step 602 includes generating a first graphical user interface (e.g., 312) element that depicts the simple-span bridge and that includes a first segment (e.g., 314) having a first prioritization score and a second segment (e.g., 316) having a second prioritization score. The first segment includes a first visual distinction and the second segment includes a second visual distinction. The visual distinctions provide a visual indication that a priority of repairing the first segment is higher than a priority of repairing the second segment. For example, segments 314 and 316 are shaded to include different patterns; however, other visual distinctions might also be used, such as color coding.

In step 604 an indication is received that the first segment was selected in a graphical user interface of the client device. For example, a user might select the first segment using a cursor, a touch surface, and the like.

In response to the indication that the first segment was selected, at step 606 a set of information is retrieved that is related to the first segment and that was used to calculate the first prioritization score. Moreover, in step 608 the set of information is provided to the client device to be presented in the graphical user interface.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory, computer-readable storage media storing computer-executable instructions that, when executed, cause a computing device to perform a method of prioritizing repair of a simple-span bridge, the method comprising:

generating a condition score of a segment of the simple-span bridge based on a mathematical combination of condition ratings of bridge elements included in the segment;

generating a load-rating score of the segment that is based on an equipment score of a load case that is adjusted by a percentage of traffic associated with the load case;

generating a segment prioritization score of the segment that indicates a priority of repairing the segment and that is based on a combination of the condition score and the load-rating score; and storing the segment prioritization score in a data store.

2. The media of claim 1, wherein the mathematical combination includes weighting each condition ratings to generate condition scores of each bridge element.

3. The media of claim 1, wherein the condition score and the load-rating score are weighted when the segment prioritization score is generated.

4. The media of claim 1, wherein the method further comprises generating a risk score of the segment and generating an importance score of the segment, and wherein the segment prioritization score is further comprised of the risk score of the segment and the importance score of the segment.

5. The media of claim 4, wherein the risk score of the segment is based on one or more flags associated with the segment.

6. The media of claim 1,
wherein the method further comprises comparing the segment prioritization score to another segment prioritization score of another segment of the simple-span bridge to determine that the priority of repairing the segment is greater than another priority of repairing the other segment, and
wherein the segment prioritization score is weighted higher than the other prioritization score, based on the priority being deemed greater, when determining a prioritization score of the simple-span bridge.

7. The media of claim 1, wherein the condition ratings of bridge elements include a substructure condition rating of substructure included in the segment, a superstructure condition rating of superstructure included in the segment, a deck-structure condition rating of deck structure included in the segment, and a channel/waterway-structure condition rating of channel/waterway-structure included in the segment.

8. Non-transitory, computer-readable storage media storing computer-executable instructions that, when executed, cause a computing device to perform a method of prioritizing repair of a simple-span bridge, the method comprising:

generating a first prioritization score of a first segment of the simple-span bridge that indicates a priority of repairing the first segment and that is based on a first condition score of the first segment, wherein the first condition score is calculated using a first set of condition ratings assigned to structural elements included in the first segment;

generating a second prioritization score of a second segment of the simple-span bridge that indicates a priority of repairing the second segment and that is based on a second condition score of the second segment, wherein the second condition score is calculated using a second set of condition ratings assigned to structural elements included in the second segment;

comparing the first prioritization score to the second prioritization score to determine that the priority of repairing the first segment is higher than the priority of repairing the second segment; and responsive to the comparing, assigning an overall prioritization score to the simple-span bridge that is equal to the first prioritization score of the first segment.

9. The media of claim 8,
wherein the first set of condition ratings includes a first substructure condition rating of substructure included in the first segment, a first superstructure condition rating of superstructure included in the first segment, a first deck-structure condition rating of deck structure included in the first segment, and a first channel/waterway-structure condition rating of channel/waterway-structure included in the first segment, and
wherein the second combination of condition ratings includes a second substructure condition rating of substructure included in the second segment, a second superstructure condition rating of superstructure included in the second segment, a second deck-structure condition rating of deck structure included in the second segment, and a second channel/waterway-structure condition rating of channel/waterway-structure included in the second segment.

10. The media of claim 8, wherein calculating a first condition score of the first segment includes weighting each of the conditions ratings included in the first set of condition ratings, and wherein calculating a second condition score of the second segment includes weighting each of the conditions ratings included in the second set of condition ratings.

11. The media of claim 8, wherein calculating the first priority score includes:
determining that a condition rating included in the first set of condition ratings fails to satisfy a condition-rating threshold, and
increasing a weight of the condition rating used in calculating the first condition score.

12. The media of claim 8,
wherein calculating the first prioritization score comprises combining the first condition score of the first segment with a first risk score of the first segment that is based on one or more flags associated with the first segment, scour associated with the first segment, structural redundancy associated with the first segment, vehicle collisions associated with the first segment, or a combination thereof, and
wherein calculating the second prioritization score comprises combining the second condition ratings of the second segment with a second risk score of the second segment that is based on one or more flags associated with the second segment, scour associated with the second segment, structural redundancy associated with the second segment, vehicle collisions associated with the second segment, or a combination thereof.

13. The media of claim 12,
wherein the first prioritization score further comprises a first load-rating score of the first segment and first importance score of the first segment, and
wherein the second prioritization score further comprises a second load-rating score of the second segment and second importance score of the second segment.

14. The media of claim 13, wherein the first condition score, the first risk score, the first load-rating score, and the first importance score are each weighted to generate the first prioritization score, and wherein the second condition score, the second risk score, the second load-rating score, and the second importance score are each weighted to generate the second prioritization score.

15. Non-transitory, computer-readable storage media storing computer-executable instructions that, when executed, cause a computing device to perform a method of prioritizing repair of a simple-span bridge, the method comprising:
generating a condition score of a segment of the simple-span bridge based on a mathematical combination of condition ratings of bridge elements included in the segment;
generating a load-rating score of the segment that is based on an equipment score of an equipment type that is adjusted by a percentage of traffic associated with the equipment type;
generating a risk score of the segment that is based on a flag associated with the segment;
generating an importance score of the segment that quantifies an importance associated with the segment;
generating a segment prioritization score of the segment that indicates a priority of repairing the segment and that is based on a combination of the condition score, the load-rating score, the risk score, and the importance score; and
storing the segment prioritization score in a data store.

16. The media of claim 15, wherein the condition score, the load-rating score, the risk score, and the importance score are weighted in an algorithm used to generate the segment prioritization score.

17. The media of claim 14,
wherein the method further comprises comparing the segment prioritization score to another segment prioritization score of another segment of the simple-span bridge to determine that the priority of repairing the segment is greater than another priority of repairing the other segment, and
wherein the segment prioritization score is weighted higher than the other prioritization score, based on the priority being deemed greater, when determining a prioritization score of the simple-span bridge.

18. The media of claim 14, wherein the condition ratings of bridge elements include a substructure condition rating of substructure included in the segment, a superstructure condition rating of superstructure included in the segment, a deck-structure condition rating of deck structure included in the segment, and a channel/waterway-structure condition rating of channel/waterway-structure included in the segment.

19. Non-transitory, computer-readable storage media storing computer-executable instructions that, when executed, cause a computing device to perform a method of prioritizing repair of a simple-span bridge, the method comprising:
providing to a client device a graphical-user-interface element that depicts the simple-span bridge and that includes a first segment having a first prioritization score and a second segment having a second prioritization score, wherein the first segment includes a first visual distinction and the second segment includes a second visual distinction, which provides a visual indication that a priority of repairing the first segment is higher than a priority of repairing the second segment;
receiving an indication that the first segment was selected in a graphical user interface of the client device;
in response to the indication that the first segment was selected, retrieving a set of information that is related to the first segment and that was used to calculate the first prioritization score; and
providing the set of information that is related to the first segment to the client device to be presented in the graphical user interface.

20. The media of claim 19, wherein the first visual distinction and the second visual distinction include a color-coding scheme to provide the visual indication.

21. The media of claim 19, wherein the method further comprises:
- receiving an indication that the second segment was selected in the graphical user interface of the client device;
- in response to the indication that the second segment was selected, retrieving a set of information that is related to the second segment and that was used to calculate the second prioritization score; and
- providing the set of information that is related to the second segment to the client device to be presented in the graphical user interface.

22. The media of claim 19, wherein the set of information that is related to the first segment includes a condition score based on a mathematical combination of condition ratings of bridge elements included in the first segment.

23. The media of claim 19, wherein the set of information that is related to the first segment includes a load-rating score of the first segment that is based on an equipment score of a load case that is adjusted by a percentage of traffic associated with the load case.

24. The media of claim 19, wherein the set of information that is related to the first segment includes a risk score of the first segment that is based a flag associated with the first segment.

25. The media of claim 19, wherein the set of information that is related to the first segment includes an importance score of the first segment that is based on ridership, availability of alternative transportation services, network importance, or a combination thereof.

* * * * *